United States Patent [19]

Sluijter et al.

[11] Patent Number: 5,103,311
[45] Date of Patent: Apr. 7, 1992

[54] DATA PROCESSING MODULE AND VIDEO PROCESSING SYSTEM INCORPORATING SAME

[75] Inventors: Robert J. Sluijter; Cornelis M. Huizer; Hendrik Dijkstra, all of Eindhoven, Netherlands; Gerrit A. Slavenburg, Sunnyvale, Calif.

[73] Assignee: U.S. Philips Corporation, New York, N.Y.

[21] Appl. No.: 593,366

[22] Filed: Oct. 1, 1990

Related U.S. Application Data

[63] Continuation of Ser. No. 290,979, Dec. 28, 1988, abandoned.

[30] Foreign Application Priority Data

Jan. 11, 1988 [NL] Netherlands ........................ 8800053

[51] Int. Cl.[5] .............................................. H04N 5/14
[52] U.S. Cl. .................................................. 558/160
[58] Field of Search ................. 358/160, 167, 22, 183; 382/27, 41, 42, 49; 364/133, 134, 131, 518, 521

[56] References Cited

U.S. PATENT DOCUMENTS

| | | | |
|---|---|---|---|
| 4,365,104 | 12/1982 | Nussmeier | 358/166 |
| 4,628,481 | 12/1986 | Reddaway | 382/41 |
| 4,790,026 | 12/1988 | Gennery et al. | 382/41 |
| 4,797,740 | 1/1989 | Harasaki et al. | 358/133 |
| 4,800,430 | 1/1989 | Murakami et al. | 358/160 |
| 4,853,784 | 8/1990 | Abt et al. | 358/183 |

FOREIGN PATENT DOCUMENTS 2141847 1/1985 United Kingdom ................. 382/41

OTHER PUBLICATIONS

"The 13th Annual International Symposium of Computer Architecture", Computer Architecture News, vol. 14, No. 2, Jun. 1986.

Primary Examiner—Howard W. Britton
Assistant Examiner—David E. Harvey
Attorney, Agent, or Firm—Michael E. Marion

[57] ABSTRACT

The invention describes a processor system suitable for processing video signal samples on a real-time basis. Signals are derived from the samples for driving an imaging unit. For this purpose, one or more processor modules are provided with processor elements, operating in parallel in time, which are connected to a crossbar switch. A module contains at least one arithmetic-/logic processor element and at least one memory processor element. Moreover, there is a clock device, the frequency of which bears a fixed relationship to the frequency with which the video signal samples are obtained.

31 Claims, 5 Drawing Sheets

DATA PROCESSING MODULE AND VIDEO PROCESSING SYSTEM INCORPORATING SAME

This is a continuation of application Ser. No. 07/290,979 filed Dec. 28, 1988, now abandoned.

BACKGROUND OF THE INVENTION

The present invention relates to a processor module and a system for processing video signal samples on a real-time basis, and also to an imaging system and an image storage system for video signals provided with such a video processor system. The video signals supplied can be formed by component signals (R, G, B or Y, U, V), by combined signals as defined in the PAL or NTSC standard, or by unstandardized signals, such as are supplied, for example, by a VCR apparatus or a video disk. The processing result should be suitable for driving, for example, an imaging unit, such as a CRT or an LCD, or for being recorded on a magnetic tape. In the video processor system, the video signal samples should undergo diverse operations. Said operations may relate, for example, to filtering, correlating, and repositioning of information both within a video line and between video lines within a field or between fields within a frame.

SUMMARY OF THE INVENTION

The object of the present invention is inter alia to provide an architecture for a processor module which can be used in a video processing system and which is flexible and readily adaptable to the desired operations to be carried out on the video signals; precisely because the video signals have to be processed on a real-time basis, said operations will often have to be carried out in parallel.

According to another aspect of the invention, a video processor system for processing video signal samples on a real-time basis is put forward which is provided with at least one processor unit for deriving, from the video signal samples supplied, signals which are suitable for driving an imaging unit, the processor unit comprising at least one processor module with processor elements operating in parallel in time, including at least one arithmetic and/or logic processor element and at least one memory processor element, and a crossbar switch to which input signals for the processor module and output signals from the processor elements belonging to the respective processor module can be supplied and from which input signals for the processor elements belonging to said processor module and output signals from said processor module can be obtained, the video processor system being provided, moreover, with a clock device for controlling the processor units, the frequency of which clock device bears a fixed relationship to the frequency with which the video signal samples are obtained. The fact that the signals derived in the video processor unit are suitable for driving an imaging unit implies in this case that said signals are able to drive an imaging unit directly and can also first be subjected to yet a further signal processing before driving an imaging unit, or may even first be recorded on a magnetic tape or other storage medium in order to be able to drive an imaging unit later.

The video processor system according to the invention has an architectural hierarchy in three levels, viz. processor units, processor modules and processor elements. As a result of this, a modular generalized framework becomes possible in which a multiplicity of operations can be executed simultaneously, the fixed relationship between sampling frequency and clock frequency at all levels in the video processor system making data processing on a real-time basis possible without additional buffering. If several processor units are present, they can be connected in a series, a parallel and/or a fed-back configuration. Each processor unit may be provided with several, preferably three, processor modules and is preferably constructed as a separate integrated circuit. Each processor module may comprise several, for example three, arithmetic and/or logic processor elements and several, for example two, memory processor elements, while a gate processor element may furthermore be present in addition at the input or the output of the processor module. Each processor module is, moreover, provided with a crossbar switch which can be formed, for example, by the input circuits of the processor elements.

The article entitled "Warp Architecture and Implementation" by M. Annaratone et al. from the "13th Annual symposium on computer architecture, June 1986, Tokyo (Japan)" discloses a "Systolic array computer (Warp)" in which a row of processor units is present and each processor unit is provided with at least one arithmetic and logic processor element and at least one memory processor element, a crossbar switch, moreover, being present to which, via a buffer circuit, input signals for a processor unit and output signals from the processor elements belonging to the respective processor unit can be fed and from which input signals for the processor elements belonging to said processor unit and output signals from said processor unit can be obtained. . The data which are processed in this parallel computer system in the said publication are stored with the aid of an I/O unit in a buffer and are further processed therefrom. The system therefore does not function on a real-time basis. The system is, moreover, not adapted for processing video signals specifically, it being necessary to take into account not only the presence of specific video line memory means and field memory means, but also the above-mentioned fixed relationship between the clock signals at all levels in the hierarchy and those which are necessary for sampling the video signals. The architecture of the video processor system according to the invention is, furthermore, not based specifically on a row of processor elements; the processor units may be connected in a series, a parallel and/or a fed-back configuration, which increases the flexibility of the system.

FURTHER ASPECTS OF THE INVENTION

In a particular embodiment, the memory capacity of the memory means in the processor elements is sufficient for storing the data relating to at least one video line in order to be able to carry out, for example, correlation operations between consecutive video lines in the system, one or more separate field memories, moreover, being present which are in communication with one or more video processor units. Each processor element has its own control element in which the program memory for the respective processor element is accommodated. Stored in said memory is a cycle of branch-free instructions, for example a maximum of sixteen, with the aid of which operations can be carried out in the respective processor element. The crossbar switch is controlled from the program memories belonging to a processor module. If the program memory is formed by a RAM memory, this is loaded in an initiation process; with the exception of the initiation bus necessary therefore no further control bus is present in the video processor units, apart from a reset signal conductor which may, however, be assigned to the initiation bus. As a result of the individual programability, the processor elements may have mutually different program lengths which further increases the flexibility.

Conflicts may arise as a result of the nature of the crossbar switch and the programming of the various processor elements; if, for example, information which is intended for one and the same input of a processor element appears at the output of two processor elements at the same time, such a conflict is produced. An effective solution for such conflicts is given in U.S. Pat. No. 4,521,874 in which a buffer register is provided at each of the switch points of a crossbar switch. This solution is relatively expensive and takes up a large chip surface. In a particular embodiment, each processor module comprises as many so-called silo registers as the crossbar switch has outputs; the data is written into said silo registers in a fixed sequence but is read out in a sequence determined by the program in the program memory of the respective processor element. As a result of this, the solution is cheaper than that of the abovementioned U.S. patent is avoided, although flexibility is to some extent lost.

In each of the program memories, a fixed cycle of instructions is always generated; the frequency with which this cycle is repeated again bears a fixed relationship to the frequency of the video signal stream. A reset signal can achieve the result that the first instructions of the respective cycles of all the program memories are generated at one and the same instant. The cyclic programs ensure, provided, of course, sufficient video processor units are present, that the desired operations can be carried out on each stream of video signals on a real-time basis. In addition, the communication between the video processor units is relatively simple because a synchronous control can already be determined during programming. Although they are in different processor modules or different video processor units, the communication between all the processor elements proceeds under the control of the said cyclic programs.

The architecture described here makes programming relatively simple, while the connected processor elements can be efficiently utilized.

The present invention further relates to an imaging system provided with means for receiving frame-sequential and line-sequential image information from a source device, a video processor system according to the invention and means for effecting the imaging of an image. The source device may in this case be formed by a video signal receiver, a video recorder or a video disk. The present invention further relates, in addition, to an image storage system provided with means for receiving frame-sequential and line sequential image information from a source device, a video processor system according to the invention and means for effecting the image storage. In principle, the same source devices can be used here as for the abovementioned imaging system.

Finally, the invention furthermore relates to the integrated circuit provided with a processor unit as described above.

BRIEF DESCRIPTION OF THE FIGURES

The invention will now be explained in more detail with reference to the accompanying drawings, in which.

The invention is in no way restricted to the exemplary embodiment described with reference to the drawings; this preferred embodiment serves only to illustrate the invention.

DESCRIPTION OF A PREFERRED EMBODIMENT

Figure 1:
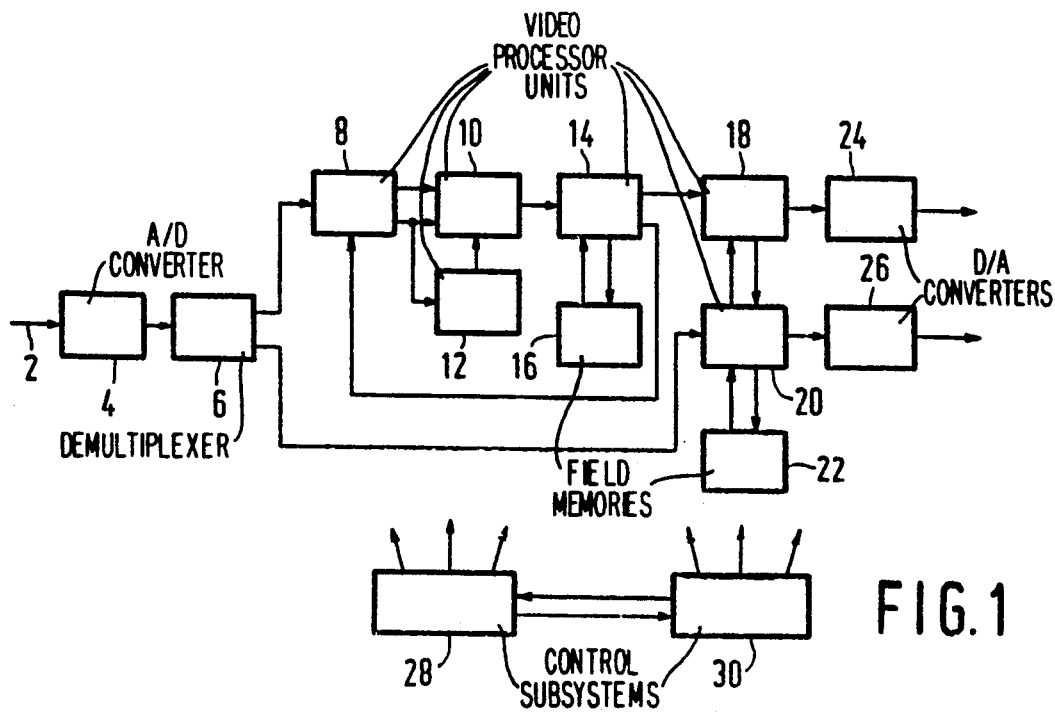
FIG. 1 shows an example of a video processor system according to the invention.

FIG. 1 gives an example of a video processor system according to the invention. Analog video signals which are formed in a known manner by a video camera, video cassette recorder, video disk player or in some other manner appear on the input 2. An A/D converter 4 converts said video signals at a sampling frequency determined by clock signals into a train of digital video signal samples which are subsequently distributed by a demultiplexer 6 over two outputs according to a predetermined distribution. As a result, each substream of video signal samples can be processed at a lower frequency than that at which the complete stream of video signal samples is fed in so that signals can be processed which could otherwise probably not be processed as a result of an excessively high sampling frequency. Connected to the uppermost output of the demultiplexer 6 is a processor unit 8 which executes a first operation. The results are fed via two outputs to another processor unit 10 and, via one of these two, in addition to a third processor unit 12. The results from the processor unit 12 are also processed in the processor unit 10. The output of the processor unit 10 is connected to a processor unit 14. The latter is in this case bidirectionally in communication with a field memory 16; this is, for example, a CCD memory. Operation results appear, moreover, on two outputs of the processor unit 14. The results from the lowermost output are fed back therefrom to the processor unit 8, as a result of which a recursive operation becomes possible. The uppermost output of the processor unit 14 is connected to a fourth processor unit 18. The lowermost output of the demultiplexer 6 is connected to a processor unit 22 which is in communication with a field memory 20 bidirectionally. The processor units 18 and 20 are connected to each other bidirectionally. In this manner, the two parts of the input signal can be processed in different manners, a recorrelation being possible as a result of this latter mutual connection. D/A converters 24 and 26 respectively are connected to the processor units 18 and 20 at the outputs. The output signals thereof may, for example, be used to drive a cathode ray tube (not shown). Two further sub-systems 28 and 30 provide the general control. The subsystem 28 forms a clock device in which the clock signals are generated with which the A/D converter 4, the demultiplexer 6, the processor units 8, 10, 12, 14, 18 and 20, the field memories 16 and 22 and the D/A converters 24 and 26 are controlled so that all the operations may take place in a mutually fixed time relationship. The basic clock frequency of the subsystem 28 and, consequently, the clock signals derived therefrom for controlling the video processor system, including that for sampling the video signals fed in bear in this case, in addition, a fixed relationship to the frequency with which video lines and, consequently, the respective fields occur. The subsystem 30 forms a system control device and can, for example, execute reprogramming operations on the respective processor units, for example for adjusting filter coefficients. The subsystems 28 and 30 are connected to each other bidirectionally. The subsystem 30 has at the same time the facility (not shown in the figure) for receiving signals from outside the system, for example, to initiate the said reprogramming. For the sake of simplicity, the further connections of the subsystems 28 and 30 are not depicted.

Figure 2:
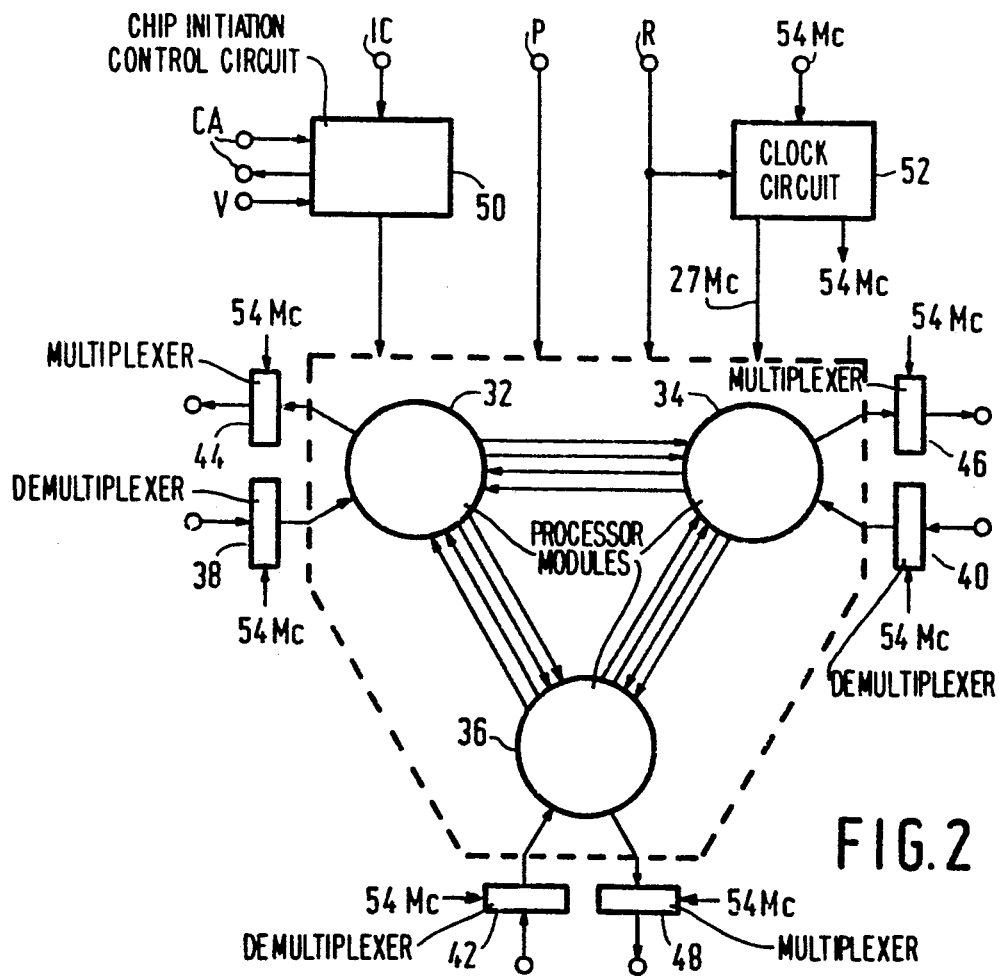
FIG. 2 shows an example of the structure of one single processor unit.

FIG. 2 gives an example of the structure of one single processor unit. Such a video processor unit is realized as one single integrated circuit (chip) in CMOS technology, the processor modules surrounded by a broken line being controlled by a 27 MHz clock signal. Within the processor unit there are three processor modules 32, 34 and 36 which are directly connected to each other bidirectionally. Although this will also be advantageous with a larger number of processor modules it will not always be realizable because, as the number of processor modules increases, the number of interconnections rapidly becomes larger and a correspondingly larger chip surface is taken up. In the embodiment shown, each processor module has 5 input and 5 output channels of 12 bits each. Of these, one input and output channel in each case provides the contact with other possible processor units or other types of unit. The chip depicted in FIG. 2 further comprises 3 data gates each with a demultiplexer 38, 40 and 42 respectively, and a multiplexer 44, 46 and 48 respectively, while, finally a chip initiation control circuit 50 and a clock circuit 52 are also present. As already stated, the processor modules operate at a frequency of 27 MHz; in the clock circuit 52, this frequency, which bears a fixed relationship to the sampling frequency of the video signals, is derived from a 54 MHz clock signal fed to the chip. Said clock signal is used here to control the multiplexers and demultiplexers in the data gates and, specifically, to convert the 12-bit/27 MHZ data provided by the processor modules into 6-bit/54 MHz data and, vice versa, to convert 6-bit/54 Mc/s data into 12-bit 27 MHz data to be fed to the processor modules. The contact with other possible processor units and other types of units then proceeds via 6-bit/54 MHz channels. This provision, which is obviously optional, has the advantage that the number of external connections to the chip are severely limited. The 27 MHz clock signal is derived from the 54 MHz clock signal in the clock circuit 52 with the aid of a scale-of-two circuit, the phase of the 27 MHz clock signal being monitored by a reset signal R which is fed not only to all the processor modules on the chip, but also to the clock circuit 52. The chip initiation control circuit 50 has a clock and serial data input and a clock and serial data output connected to each processor module. Said clock and serial data, which is fed to the processor modules via the circuit 50, is indicated by IC. The chip initiation control circuit 50 is furthermore provided, in a serpentine configuration, with an 8-bit serial chip address CA and a chip address valid signal V; the addressing of the initiation data will be dealt with below. Apart from the power connections P, 3×6 data input connections, 1 reset signal connection, 2 IC connections and 3 connections for the chip addressing for the initiation data are present on the chip; the chip therefore contains 43 connection pins, apart from the power connections.

DESCRIPTION OF A PROCESSOR MODULE

Figure 3:
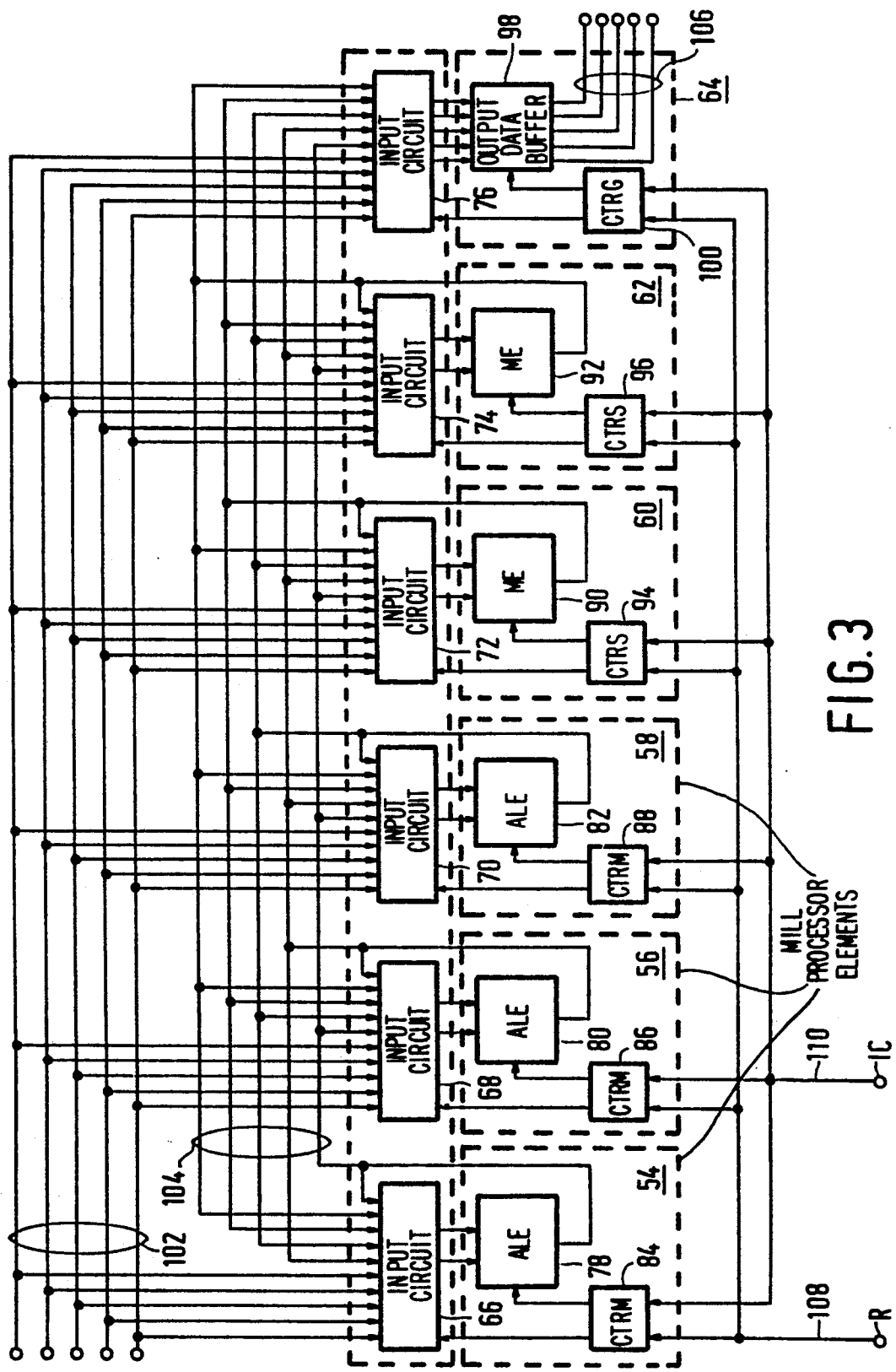
FIG. 3 shows a possible structure of one single processor module.
Figure 4:
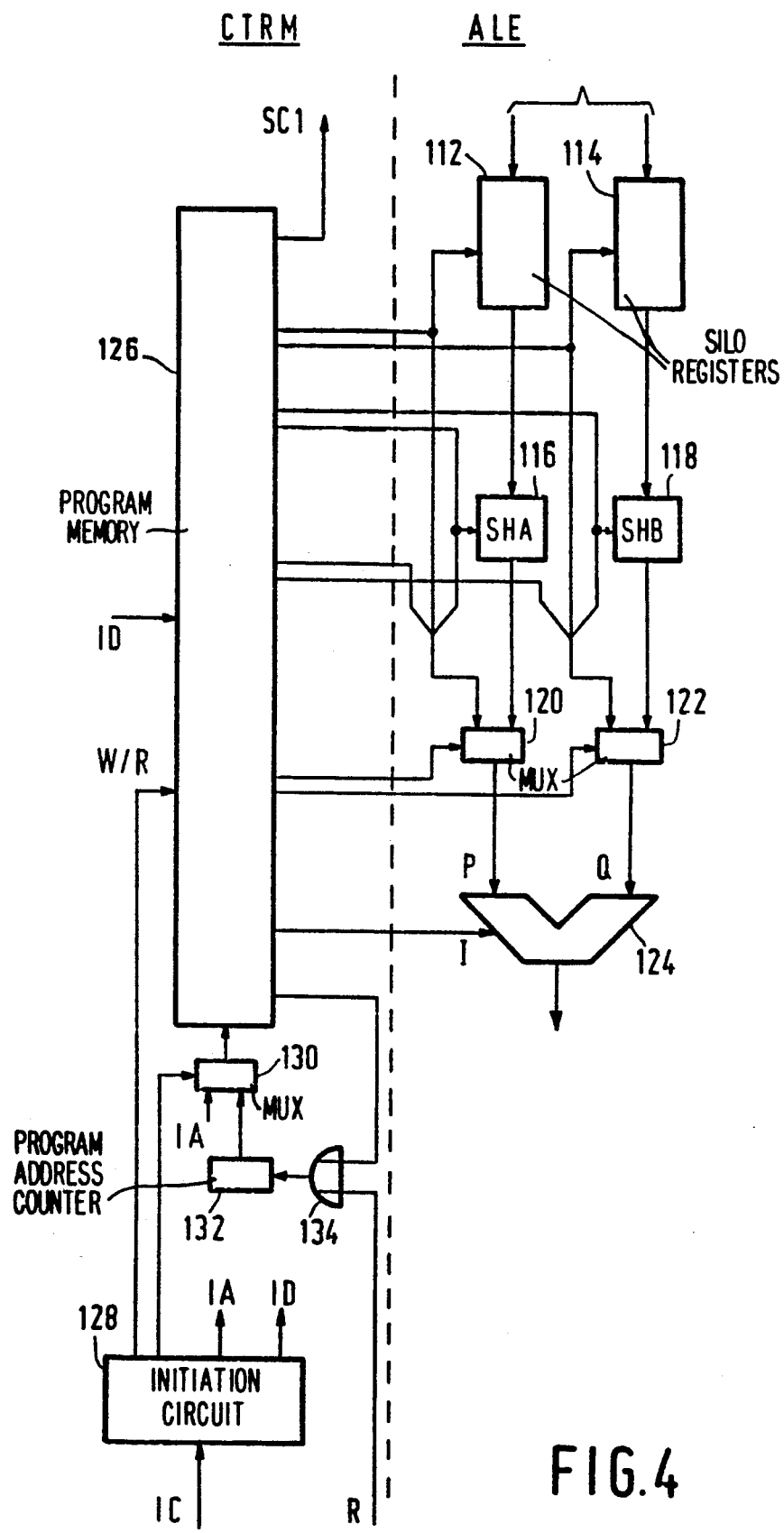
FIG. 4 shows an embodiment of an arithmetic and logic processor element of a processor module.

FIG. 3 depicts the structure of one single processor module. Here this comprises three identical processor elements (MILL) 54, 56 and 58 for performing arithmetic and logic operations, two identical processor elements having a memory function 60 and 62 and an output gate processor element 64. Each of these elements is connected to an input circuit 66, 68, 70, 72, 74 and 76 respectively. These input circuits together form a crossbar switch. The MILL processor elements each comprise an arithmetic and logic element (ALE) 78, 80 and 82 respectively, and a control element (CTRM) 84, 86 and 88 respectively. The memory processor elements comprise a memory element (ME) 90 and 92 respectively and a control element (CTRS) 94 and 96 respectively. The output gate processor element comprises an output data buffer 98 and a control element (CTRG) 100. The processor module input signals are fed to the crossbar switch via the five 12-bit channels 102 and the output signals from the processor elements belonging to the respective processor module via the five 12-bit channels 104. Processor module output signals are obtained from the crossbar switch via five 12-bit channels 106. Furthermore, a connection 108 is indicated for the reset signal R to the control elements 84, 86, 88, 94, 96 and 100, and also the two-wire clock and serial data (IC) connection 110 to all said control elements. It will furthermore be clear that, instead of the output gate processor element 64, an input gate processor element with the same function can also be used; for the diverse processor modules connected to each other, a buffer is present in both cases between every two processor modules. The various input circuits are controlled from the respective control elements. The distribution of the data stream over the respective processor elements, processor modules and video processor units, therefore, is controlled solely by the control elements FIG. 4 shows to the right of the broken line the block diagram of an arithmetic and logic element (ALE) and to the left of the broken line the associated control element (CTRM). The ALE comprises two 12-bit inputs with a silo register 112, 114 respectively, the output of which silo registers is connected to shift units (SHA, SHB) 116 and 118 respectively (formed, for example, by "barrel shifters"). The output of said shift units is connected via multiplexers 120 and 122 respectively to the P and Q inputs respectively of a ALU 124. The CTRM comprises a program memory 126, an initiation circuit 128, an address multiplexer 130, a program address counter 132 and an OR gate 134. The silo registers have a memory function for 32 words, writing taking place in a fixed sequence, while reading out takes place in a sequence determined by the program memory 126. The write address is generated by a 5-bit counter belonging to the silo registers, while the read address is obtained by subtracting a relative read address (RAD) from the write address determined by the program memory. In this manner, delays are realized by the silo registers over RAD clock periods, RAD being a sign-free integer which may change every clock cycle. The silo registers can be written in and read out at the same time, but not at the same address, so that $0 < RAD \leq 31$. The 12-bit data words originating from the silo registers may be subjected to a shift operation determined by the program memory in the shift units 116 and 118. 12 logic shift operations to the right, 12 logic shift operations to the left and 12 arithmetic shift operations to the right are, for example, possible; the 6-bit shift control signals may be fed in for this purpose by the program memory. The 12-bit data words originating from the shift units are fed via multiplexers 120 and 122 to the ALU 124, which delivers the ALE output signal. The ALU 124 is controlled from the program memory and, to be specific, via the I input, and performs the usual arithmetic and logic operations. The multiplexers 120 and 122 offer the possibility of replacing a data word by a constant from the program memory 126. This 12-bit constant can then, for example, be formed by the 5 bits which are otherwise used for the RAD delay, and the 6 bits which are otherwise used as shift control signal, plus 1 additional bit. The multiplexers 120 and 122 are controlled by a 1-bit control signal from the program memory. The program memory has capacity for 16 words of 55 bits, the 4-bit addresses being fed in via the address multiplexer 130. The program length is adjustable up to 16 steps at the most by making use of the reset facility of the program address counter 132; the reset signal delivered by the program memory is fed to said counter via the OR gate 134. The program counter may also be reset by the external reset signal R. Via the chip initiation control circuit 50, initiation and reprogramming data can be received which, for each data unit, are made up of a program memory address IA and initiation data ID. Said data units are fed serially over one wire of the IC connection, clock signals being delivered via the other wire of said connection in order to specify both the beginning and the end of the data units, and also the individual bits of said data units. In the initiation circuit 128, the serial data units are converted to parallel form and, to be specific, into a 4-bit program memory address IA and 41-bit initiation data ID. These data are fed to the program memory 126. In this process, the program memory address flows via the address multiplexer 130. When a data unit has been received by the initiation circuit 128, the multiplexer 130 is activated so that the program memory address IA originating from said initiation circuit is transmitted, while a write signal W/R is emitted at the same time so that the data ID can be written into the program memory. The addressing of the initiation data is dealt with further below. Finally, attention should also be drawn to the fact that the program memory delivers the control signal SC1 for the crossbar switch.

Figure 5:
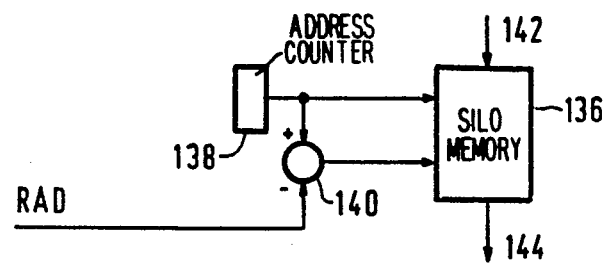
FIG. 5 shows an embodiment of a silo register in greater detail.

FIG. 5 shows in more detail an embodiment of a silo register; said register comprises a silo memory 136, an address counter 138 and a subtraction circuit 140. The counter 138 delivers the consecutive write addresses for the 12-bit words fed to the silo register via the conductor 142. The write address with the relative read address RAD subtracted in the subtraction circuit 140 forms the read address for the 12-bit words to be read out of the silo register 136 via the conductor 144. Said relative read address RAD also determines the time delay between writing in and reading out the data words from the silo register.

Figure 6:
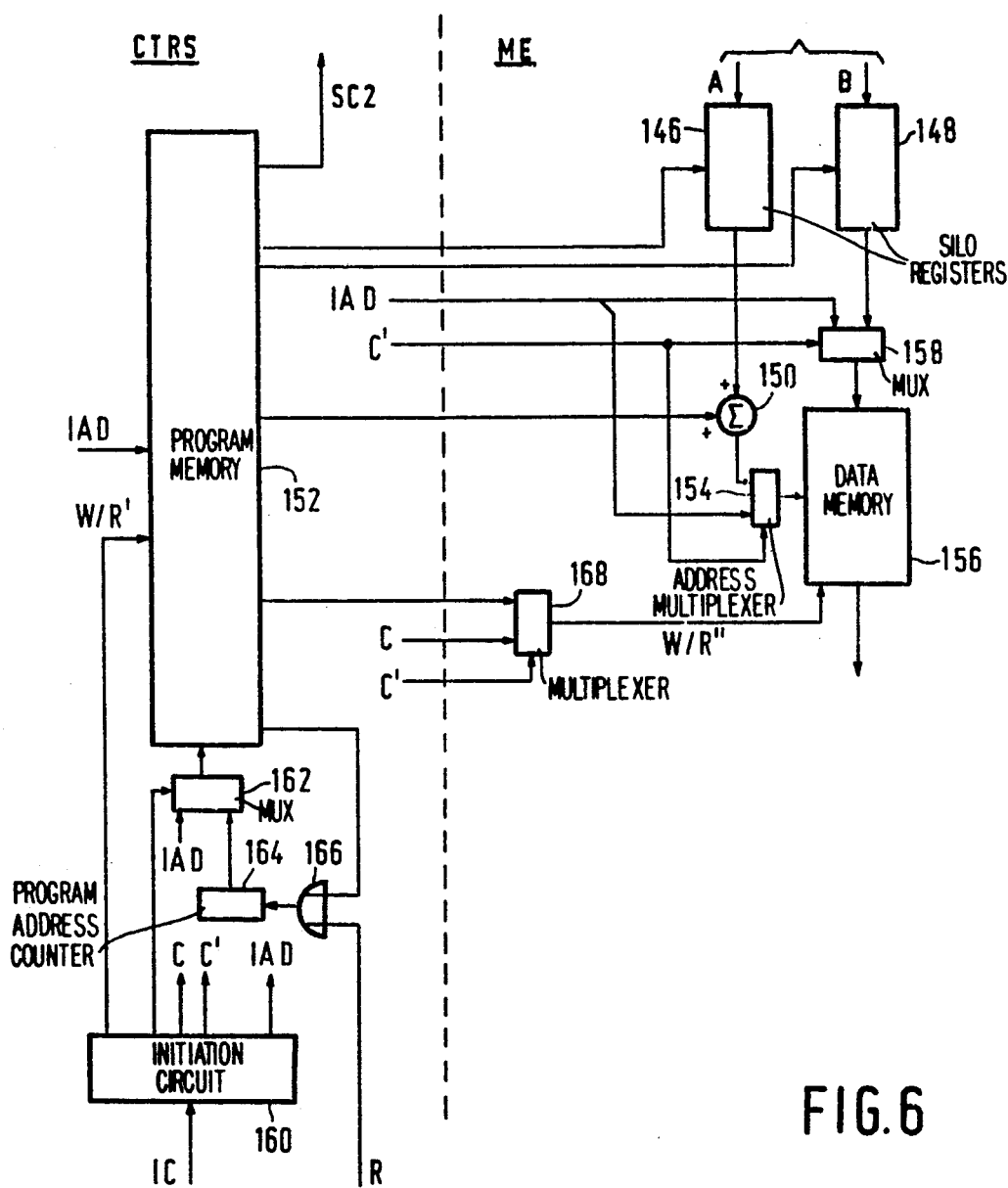
FIG. 6 shows an embodiment of a memory processor element of a processor module.

FIG. 6 shows, to the right of the broken line, the block diagram of a memory element ME and, to the left of the broken line, the associated control element CTRS. The ME comprises two 12-bit inputs A and B with a silo registers 146 and 148 respectively. The input A forms an address input and the input B a data input. The output of the address silo register 146 is fed to a summing circuit 150, which makes a so-called memory pagination possible. The summing is executed on the 9 least significant bits of the output of the address silo register 146 and a 9-bit constant from the program memory 152 of the CTRS. The 9-bit memory address thus obtained is fed via an address multiplexer 154 to a data memory 156. This memory provides capacity for 512 12-bit data words which are fed thereto via a data multiplexer 158 from the data silo register 148. Said capacity is chosen in a manner such that it is possible for two memory processor elements, that is to say two data memories, per processor module to suffice to be able to store the 12-bit words of at least one video line together in the two data memories. For this purpose, the video signal sampling frequency has to be equal to half the 27 MHz clock frequency of the processor modules. The data memory 156 is also able, moreover, to fulfill the function of "search table". For this purpose, this memory may be filled via the initiation bus. The output of the data memory 156 also forms the output of a respective memory processor element. The silo registers 146 and 148 are constructed in the same manner and function in the same manner as the silo registers 112 and 114 described above with reference to FIGS. 4 and 5. The CTRS is in principle also made up in the same manner as the CTRM in FIG. 4. Apart from the program memory 152 already mentioned, the CTRS comprises an initiation circuit 160, an address multiplexer 162, a program address counter 164 and an OR gate 166. The switches 162, 164 and 166 are identical to, and function in the same manner as, the address multiplexer 130, the program address counter 132 and the OR gate 134 in FIG. 4. The program memory 152 provides capacity for 16 words of 29 bits. The initiation circuit 160 provides the loading of the program memory 152 as well as the loading of the data memory 156 which is then functioning as a search table. The data units which, just as in the case of the initiation circuit 128 and FIG. 4, are emitted in parallel by the circuit 160, are composed of 33-bit words IAD. To write into the program memory 152, use is made of 4 bits there for the addressing, while 29-bit words are written in and, to be specific, in the same manner as was the case for the program memory 126 in FIG. 4. The addressing of the memory locations for the 29-bit words in the program memory 152 proceeds via the address multiplexer 162. To write 156 words into the data memory, 9 of the 33 bits are used for addressing the data memory 156 which proceeds via the multiplexer 154, while 12 of the 33 bits form the data words which are fed to the data memory 156 via the multiplexer 158. The control signal C' emitted via the initiation circuit 160 indicates that data words from the initiation circuit 160 should be written into the data memory 156; the multiplexers 154 and 158 are controlled with the aid of this signal. Finally, the ME also comprises a multiplexer 168 which transmits either a read-out signal from the program memory 152 or a write-in signal C for loading data words from the initiation circuit 160. This multiplexer, too, is controlled by the control signal C'. The program memory furthermore also delivers a control signal SC2 for the crossbar switch.

Figure 7:
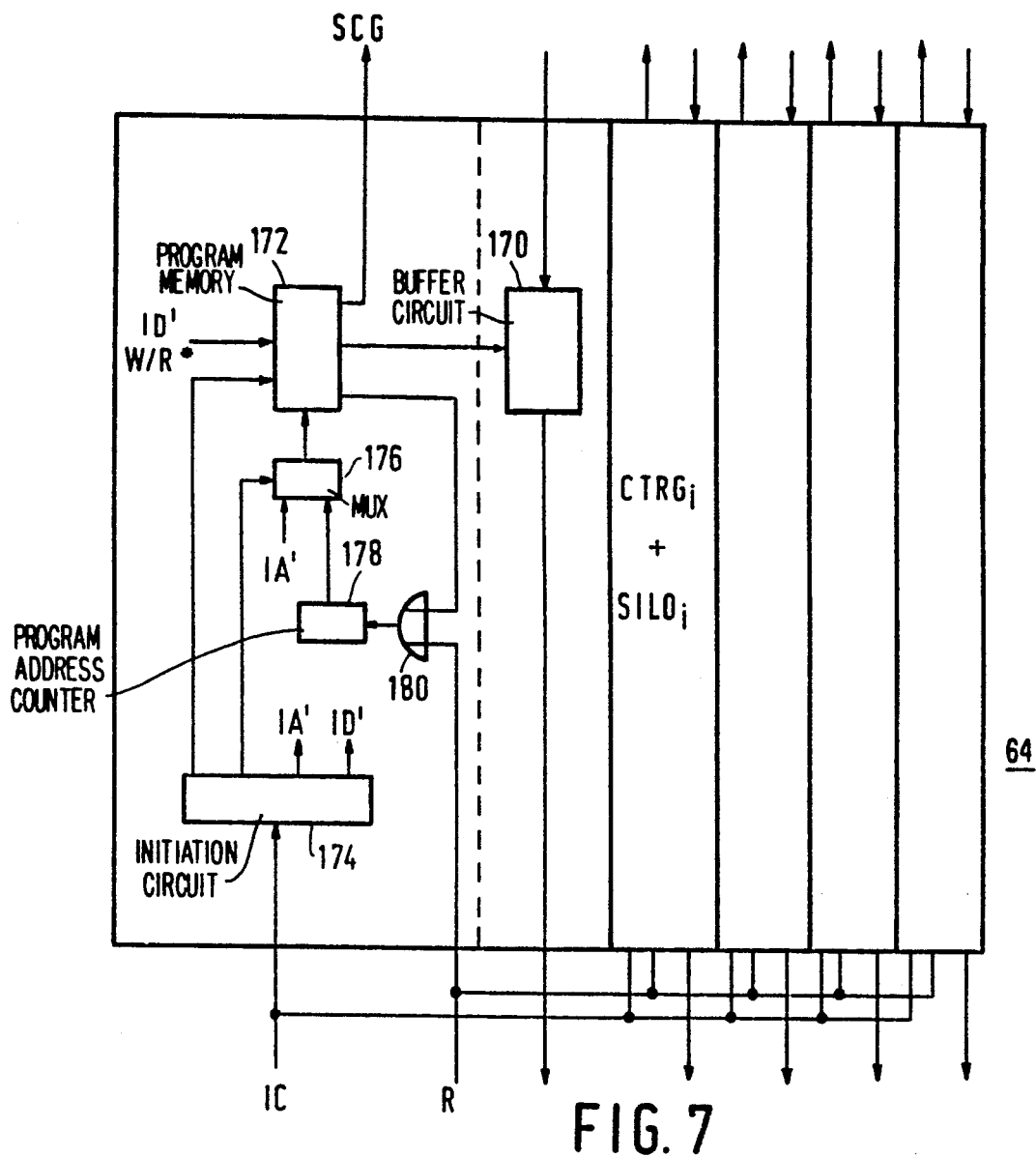
FIG. 7 shows an embodiment of a gate processor element of a processor module.

FIG. 7 shows an embodiment of the gate processor element 64 from FIG. 3. A buffer circuit 170 is present for each of the 5 input/output signals, each buffer circuit having its own control circuit CTRGi (i=1,..., 5). The 5 buffer circuits together form the output data buffer 98 (FIG. 3), the 5 associated control circuits forming the control element (CTRG) 100 (FIG. 3). The buffer circuits are formed by the silo registers SILOi (i=1,..., 5). These silo registers are identical to the silo registers 112, 114, 146 and 148 described with reference to FIGS. 4, 5 and 6. The control circuits are identical to, and function in the same manner as, the control element CTRM described above with reference to FIG. 4. In FIG. 7 only one of these control circuits is depicted in detail; this comprises a program memory 172, an initiation circuit 174, an address multiplexer 176, a program address counter 178 and an OR gate 180. The program memory 172 provides capacity for 16 words of 10 bits. These 10-bit words ID' are written into the program memory 172 after addressing with the aid of the 4 address bits IA' via the address multiplexer 176. The bits IA' and ID' are supplied in parallel by the initiation circuit 174 after having been fed bit-serially thereto. The 5 parts CTRGi and SILOi of the gate processor element have a common bit-serial bus IC and a common reset signal conductor R. The program memory in each of these 5 parts furthermore also supplies a control signal SCG for the crossbar switch.

Figure 8:
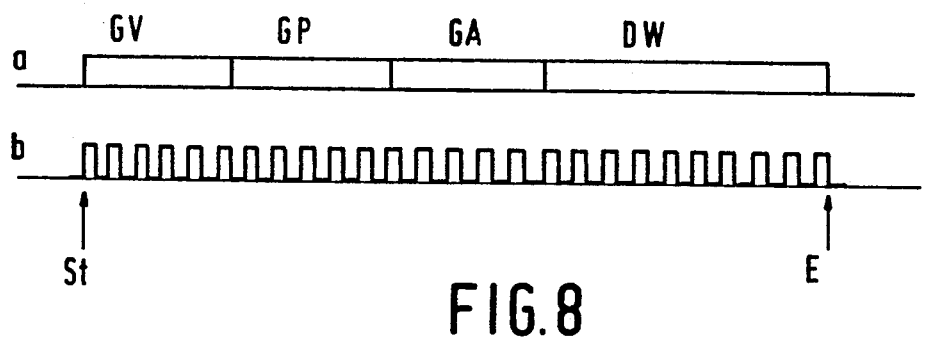
FIG. 8 shows the signals on the initiation bus for loading the program memories in the separate processor elements.

To initiate the diverse program memories and the data memory of the processor memory elements (when these are used as the search table) initiation data are sent, as already stated, via the two-wire IC bus. The initiation data comprises an indication of the start of the initiation data, address information, a data word and an indication of the end of the message. The information is transferred via a special serial data line and an associated clock line. In FIG. 8, the signal-free state on the initiation bus is indicated by a low level on both the data line a and the clock line b. The start St of the initiation data is indicated by the appearance of the clock pulses; the end E of the initiation data is indicated by the disappearance of the clock pulses over at least one clock period. The header of the initiation data itself contains diverse addresses. The address at the lowest level is the memory address GA within a processor element, this is followed by the address GP of a processor element within a processor unit and finally, at the highest level, the address GV of a processor unit. The memory addresses GA within a processor element are fed via the multiplexers 130 (FIG. 4), 154 and 162 (FIG. 6) and 176 (FIG. 7) to the respective memories. The address GP of the processor elements of the common processor modules within a processor unit is compared with the addresses introduced by the hardware in the respective initiation circuits, and if the data word DW matches the memory address GA, is transmitted by the respective initiation circuit in parallel form to the respective program memory. If several processor units, that is to say, several chips, are present, the various chip addresses CA are introduced via a serpentine line in a first initiation phase, as a result of which each chip has become identifiable. If the entrained CA address is that for the respective chip, this is indicated with the aid of the chip address valid signal V. The serpentine line is composed of series-connected shift registers which are present in the initiation control circuit 50 of each video processor unit. In the second initiation phase, the address GV of a respective processor unit is compared with the chip address CA introduced via the serpentine line, and in the event of matching, the data word DW is transmitted together with the addresses GA and GP as IC message by the initiation control circuit 50.

We claim:

1. A processor system suitable for processing video signal samples derived at a sampling frequency on a real-time basis, comprising at least one processor unit for deriving from said video signal samples, signals which are suitable for driving an imaging unit, said processor unit comprising:

at least one processor module comprising a plurality of processor elements disposed to function in parallel with one another, said processor elements including at least one processor element chosen from a group consisting of at least one arithmetic processor element, at least one logic processor element and at least one memory processor element; and a cross bar switch to which input signals for a first processor module and output signal from processor elements belonging to additional processor modules are supplied and from which input signals for said processor elements belonging to said additional processor modules and output signals from said first processor module are obtained;

the processor system further comprising a clock device for controlling said processor unit, said clock device operating at a frequency which has a fixed relationship to said sampling frequency.

2. A processor module comprising:

(a) a plurality of processor elements disposed to function in parallel with one another;

(b) a crossbar switch to which inputs as well as outputs from respective processor elements are coupled, and from which input signals for said processor elements and output signals from said processor module are obtained, said crossbar switch having a plurality of switch outputs; and (c) buffer elements coupled to each of said switch outputs.

3. A video processor system according to claim 1, there are provided at least two processor units which comprise switching means enabling their connection in a series, a parallel and/or a fed-back configuration.

4. A processor system according to claim 1, further comprising at least one field memory coupled to said processor unit.

5. A processor system according to claim 1, wherein said processor unit is comprises three mutually connected processor modules.

6. A processor system according to claim 1, wherein said processor unit is constructed as a separate integrated circuit.

7. A processor system according to claim 1 comprising a plurality of processing units each comprising a multiplex/demultiplex circuit, wherein to connect between processor modules of respective processor units, each processor module is connected to a multiplex/demultiplex circuit belonging to another processor unit, and wherein a data path width between respective processor units comprises a smaller number of bits than said input and output signals of the processor modules.

8. A processor system according to claim 1, wherein each processor module is provided with three processing elements which can include arithmetic or logic processor elements, two memory processor elements and a gate processor element.

9. A processor system according to claim 8, wherein each processor element is connected to a corresponding input circuit and in that said input circuits together form the crossbar switch.

10. A processor system according to claim 8 wherein the arithmetic and logic processor element (MILL) each comprise an arithmetic and logic element (ALE) respectively and a control element (CTRM).

11. A processor system according to claim 8 wherein the memory processor elements comprise a memory element (ME) and a control element (CTRS).

12. A processor system according to claim 8 wherein the gate processor element is formed by a data buffer and a control element (CTRG).

13. A processor system according to claim 10 wherein each of the control elements contains a program memory.

14. A processor system according to claim 13, wherein said the program memories are constructed as RAM memories and in that each processor unit is provided with an initiation bus via which the program memories are loaded.

15. A processor system according to claim 13, wherein said program memories are constructed as ROM memories into which the respective control programs have been permanently introduced.

16. A processor system according to claim 14, wherein the initiation bus is a bit-serial bus and each control element comprises an initiation circuit.

17. A processor system according to claim 11 wherein the memory element (ME) is provided with a data memory and the respective memory processor element comprises means for transferring signals derived in parallel form from the initiation circuit in said memory processor element to the data memory.

18. A processor system according to claim 10 and wherein the arithmetic, logic elements (ALE), and memory elements (ME) are provided with silo registers which form the connection to the corresponding outputs of the crossbar switch.

19. A processor system according to claim 12, wherein the data buffer is formed in the gate processor element by equally as many silo registers as there are input/output channels.

20. A processor system according to claim 18 wherein the silo registers are written to according to a fixed sequence, while reading-out takes place in a sequence determined by the program in the program memory of the respective processor element.

21. A processor system according to claim 20, wherein the silo registers comprise a subtraction circuit in which an absolute read-out address for the respective silo register is obtained by subtracting a relative read-out address RAD supplied by the program memory from a write address.

22. A processor system according to claim 13, wherein each program memory provides capacity for a fixed cycle of branch-free instructions.

23. A processor system according to claim 22, wherein the cycle comprises a maximum of sixteen instructions.

24. A processor system according to claim 1, wherein each of the video processor units comprises a clock circuit which generates a 27 MHz clock signal for the processor modules under the control of said clock device.

25. A processor system according to claim 7 wherein the multiplex/demultiplex circuits are controlled by a 54 MHz clock signal derived from the clock device.

26. A processor system according to claim 1, wherein the frequency of the clock device bears a fixed relationship to a frequency at which consecutive video lines occur in the processor system.

27. A processor system according to claim 1, wherein said processor unit contains a reset signal conductor which is common for all the processor elements.

28. A processor system according to claim 11, wherein the capacity of the memory elements (ME) of the memory processor elements in a processor module is sufficient, when combined, to store the data relating to a video line.

29. An integrated circuit provided with a processor unit as claimed in claim 1.

30. An imaging system provided with means for receiving frame-sequential and line-sequential image information from a source device, a processor system according to claim 1 and means for effecting the imaging of an image.

31. An image storage system provided with means for receiving frame-sequential and line-sequential image information from a source device, a processor system according to claim 1 and means for effecting the image storage.

* * * * *